3,411,432
WEINER AND EGG STEAMER
Mamie Willett, 808 E. Queen, Albany, Oreg. 97321
Filed Aug. 1, 1966, Ser. No. 569,380
3 Claims. (Cl. 99—355)

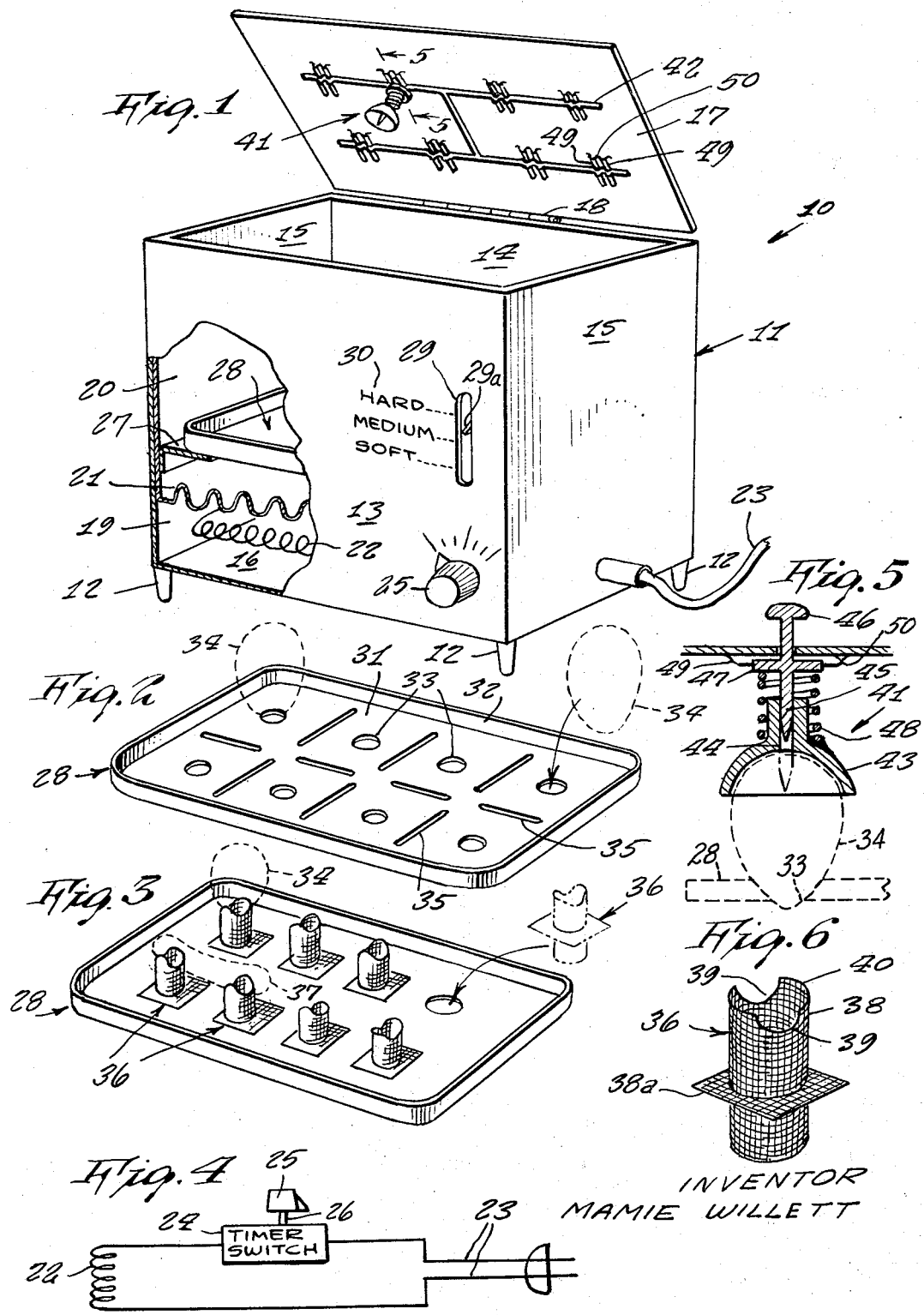

ABSTRACT OF THE DISCLOSURE

A cooker for eggs and frankfurters, including a vessel for holding boiling water, a tray, and a series of adaptors for supporting the eggs or weiners in elevated positions above the tray for steaming purpose and for positioning eggs to be pierced by a piercing unit adjustably mounted on a cover overlying the vessel.

---

This invention relates generally to food cooking apparatus. More specifically it relates to steam cooking apparatus for cooking weiners and eggs.

A principal object of the present invention is to provide a steamer for cooking weiners and eggs and which has self-contained means for interchanging the supports for eggs with the supports for the weiners.

Another object is to provide a steamer appliance for cooking weiners and eggs which includes a timer switch so that the eggs may selectively be cooked hard boiled, medium boiled or soft boiled.

Yet another object is to provide a steamer appliance for cooking weiners and eggs which includes a mechanism for piercing the end selectively of any of the eggs while within the steamer so as to ascertain the cooking condition of all the eggs therein.

Yet another object is to provide a steamer appliance wherein a relatively large number of eggs or weiners may be cooked simultaneously, and wherein they may conveniently all be removed from the steamer at one time.

Yet another object is to provide a steamer for weiners and eggs wherein the eggs and weiners may be intermixed for cooking simultaneously.

Other objects are to provide a weiner and egg steamer that is simple in design, inexpensive to manufacture, rugged in construction, easy to use, and efficient in operation.

These and other objects will be readily apparent upon a study of the following specifications and the accompanying drawing wherein;

FIGURE 1 is a perspective view of the invention showing the cover in partly open position, FIGURE 2 is a perspective view of the egg tray, FIGURE 3 is a perspective view of a modified tray adaptable for supporting either eggs or frankfurters, FIGURE 4 is an electrical diagram of the invention, FIGURE 5 is an enlarged cross sectional view taken through line 5—5 of FIGURE 1, and FIGURE 6 is a perspective view of one of the removable posts shown in operative use in FIGURE 3 for selectively supporting either frankfurters or eggs.

Referring now to the drawing in detail, the reference numeral 10 represents a weiner and egg steamer according to the present invention wherein there is a housing 11 supported upon legs 12, the housing including a front wall 13, rear wall 14, opposite side walls 15, a bottom wall 16 and an upwardly pivotable cover 17 secured by a hinge 18 along the upper edge of the wall.

The housing encloses a lower compartment 19 and an upper compartment 20 separated by a horizontal intermediate corrugated panel 21.

Within the lower compartment 19 there is an electrical heater coil 22 connected to an electric cord 23 that extends outward of the housing to an electrical supply source. As shown in FIGURES 1 and 4, the electric circuit also includes a timer switch 24 which is mounted upon the rear side of the front wall and is manually operative by a knob 25 on a shaft 26 extending through the wall so that a person may control the cooking time.

Within the upper compartment 20, angular brackets 27 at opposite ends provide support means for a removable tray 28 shown in FIGURE 2.

An indicator gauge 29 is sealingly mounted in the front panel for indicating the condition of the eggs according to a legend 30. The indicator can be related or operated in conventional manner (not shown) to the timer 25.

The tray 28 includes a bottom panel 31 and an upwardly raised peripheral wall 32. Spaced apart circular openings 33 in the bottom panel serve as seats for supporting the ends of eggs 34 therein. Slots 35 between the openings for water drainage purpose.

An adapter 36 is removably receivable within each opening 33 for purpose of converting the tray to means for supporting weiners 37 as shown in FIGURE 3, wherein it is shown that an adapter is used to support each end of a weiner. The adapter is made of screen material and includes a cylindrical tube 38 having an outwardly extending flange 38a at its midposition, and having a pair of notches 39 on opposite sides of its upper edge 40, within which a weiner may be cradled.

Upon the underside of the cover 17 an egg piercing unit 41 is supported slidably movable within an H-configurated slot 42 extending through the cover. The unit 41 includes a hemispherical inverted cup 43 which fits over the upper end of an egg. A vertical opening 44 in the cup receives a downwardly pointed pin 45, the upper end of which extends out of the housing and is topped by a knob 46 for manual adjustment. A flange 47 integral with a midportion of the pin bears against the upper end of a coil spring 48, the lower end of which bears against the cup 43. Raised ridges 49 having a groove 50 between provide means for indicating when the unit 41 is in a position over one of the eggs supported in openings 33, thereby aligning the pointed pin with the egg. As better seen in FIGURE 5, tray 28 is mounted at an elevation which will cause cup 43 to snugly engage an egg 34 for piercing by pin 45. As shown in FIGURES 2 and 3 the eggs may be supported in openings 33 or upon the top of the adapter. To cause an egg to be pierced the piercing unit 41 is moving along slot 42 into one of the desired positions between the ridges 49 wherein the pin 45 is in alignment with the egg. The cover 17 is then closed whereby the cup 43 will engage and hold the egg for piercing. Then the knob 46 is depressed causing downward motion of the pin in opening 44 until the pin axially penetrates the egg as illustrated by the dotted lines in FIGURE 5.

In operative use, eggs or weiners are loaded on the tray as above indicated. Water is then placed into the upper compartment to the level desired, and the cover is closed. The timer switch is turned on and the appliance then cooks the eggs or wieners.

It will be further noted that it is understood the upper end of spring 48 is secured to flange 47, and that the egg cup 43 is secured to the lower end of spring 48; both securements being possible by spot welds or any other means.

As is readily evident, water is placed into the compartment above panel 21, and heat is supplied therebelow for heating the water.

The H-shaped slots permits movement of the egg cup 43 so that it can be selectively aligned over anyone of the eggs placed upon the adaptors 36, the grooves 50 being over the positions of openings 33, thus assuring alignment.

While various changes may be made in the detail construction it is understood that such changes will be within the spirit and scope of the present invention as is defined by the appended claims.

Having thus set forth and disclosed the nature of this invention, what is claimed is:

1. In a wiener and egg steamer the combinaion of a housing enclosing an upper and lower compartment, a hinged cover over the said upper compartment, a heating unit within the said lower compartment, tray support means within said upper compartment, a tray for supporting weiners or eggs, and means carried by said cover for selectively piercing an egg to note its cooking condition.

2. The combination as set forth in claim 1 wherein said tray comprises a bottom panel, a raised peripheral wall, spaced apart openings in said bottom panel, slots between said openings and an adapter removably received within each of said openings in said bottom panel, said adapter being made of screening and comprising a cylindrical tube, and outward flange at a midportion of said cylinder, and a pair of oppositely spaced apart notches on the upper edge of said tube.

3. The combination as set forth in claim 2 wherein said piercing means comprises, an H-shaped slot through said cover, a hemispherical inverted cup having a central opening, a downwardly pointed pin in said opening, the upper end of said pin extending through said H-shaped slot outward of said housing and having a knob at the end thereof, a flange integral with a midportion of said pin and a compression coil spring between said flange and said cup.

References Cited

UNITED STATES PATENTS

| | | | |
|---|---|---|---|
| 1,282,230 | 10/1918 | Hoddenbach | 126—369 XR |
| 1,836,827 | 12/1931 | Thau | 99—342 XR |
| 1,865,973 | 7/1932 | Shields | 99—330 XR |
| 1,997,832 | 4/1935 | Portteus | 99—330 |
| 2,093,013 | 9/1937 | Jennings | 126—369 XR |
| 2,138,908 | 12/1938 | Douthitt | 126—369 XR |
| 2,575,608 | 11/1951 | Williams | 146—2 XR |
| 2,622,186 | 12/1952 | Hutchens | 126—369 XR |
| 3,147,689 | 9/1964 | Sakamoto et al. | 99—355 XR |

BILLY J. WILHITE, *Primary Examiner.*